US011598062B2

(12) United States Patent
Archibald

(10) Patent No.: US 11,598,062 B2
(45) Date of Patent: Mar. 7, 2023

(54) METHOD AND APPARATUS FOR COLLECTING OBJECTS FROM A SURFACE

(71) Applicant: Devin Archibald, Fort Myers, FL (US)

(72) Inventor: Devin Archibald, Fort Myers, FL (US)

( * ) Notice: Subject to any disclaimer, the term of this patent is extended or adjusted under 35 U.S.C. 154(b) by 395 days.

(21) Appl. No.: 16/793,741

(22) Filed: Feb. 18, 2020

(65) Prior Publication Data

US 2021/0254295 A1 Aug. 19, 2021

(51) Int. Cl.
*E01H 12/00* (2006.01)
*B62B 1/14* (2006.01)
*E01H 1/12* (2006.01)
*B62B 5/00* (2006.01)
*B60B 5/02* (2006.01)

(52) U.S. Cl.
CPC ............. *E01H 12/00* (2013.01); *B62B 1/147* (2013.01); *B62B 5/0013* (2013.01); *E01H 1/12* (2013.01); *B60B 5/02* (2013.01)

(58) Field of Classification Search
CPC ........... E01H 12/00; E01H 1/12; B62B 1/147; B62B 5/0013; B60B 5/02
See application file for complete search history.

(56) References Cited

U.S. PATENT DOCUMENTS

| 2,092,230 | A | * | 9/1937 | Thomas | A01G 20/43 |
| | | | | | 15/79.1 |
| 2,419,154 | A | * | 4/1947 | O'Brien | E01H 12/00 |
| | | | | | 171/86 |
| 2,546,620 | A | * | 3/1951 | Van Ness | A01D 76/003 |
| | | | | | 15/83 |
| 2,678,462 | A | * | 5/1954 | Lison | E01H 1/045 |
| | | | | | 15/352 |
| 2,744,739 | A | * | 5/1956 | Evans | E01H 12/00 |
| | | | | | 171/129 |
| 2,834,034 | A | * | 5/1958 | Angell | A46B 13/001 |
| | | | | | 15/364 |
| 3,362,480 | A | * | 1/1968 | Barber | E01H 12/00 |
| | | | | | 56/344 |
| 3,807,154 | A | * | 4/1974 | Moore | E01H 1/106 |
| | | | | | 414/440 |
| 3,923,101 | A | * | 12/1975 | Donohue | E01H 1/106 |
| | | | | | 294/19.2 |
| 4,014,390 | A | * | 3/1977 | Teixeira | A01D 17/10 |
| | | | | | 171/124 |
| 4,221,018 | A | * | 9/1980 | Hajdu | E01H 1/0836 |
| | | | | | 15/207.2 |

(Continued)

*Primary Examiner* — Jacob B Meyer
(74) *Attorney, Agent, or Firm* — Wilmer Cutler Pickering Hale and Dorr LLP

(57) ABSTRACT

An apparatus to scoop debris from a surface is described. The apparatus comprises a trolley frame, a first and second wheels coupled to a first and second gear assemblies and designed to rotate in a first direction of rotation. The first and second gear assemblies are coupled to a opposite sides of the trolley frame. The apparatus further comprises an axle coupled to the trolley frame, using the first gear assembly and the second gear assembly, wherein the axle is configured to rotate in a second direction opposite to the first direction of rotation of the first wheel and the second wheel. A plurality of parallel spokes is attached to the axle that rotate with the axle, wherein each of the plurality of spokes are bent at an angle at their respective ends. A detachable debris collection net is coupled to the trolley frame.

18 Claims, 4 Drawing Sheets

(56) References Cited

U.S. PATENT DOCUMENTS

| | | | | |
|---|---|---|---|---|
| 4,344,273 A * | 8/1982 | Jobling | A01D 43/02 | 56/364 |
| 4,550,465 A * | 11/1985 | Chrisley | E01H 1/106 | 414/439 |
| 4,593,426 A * | 6/1986 | Chrisley | E01H 1/047 | 56/364 |
| 4,603,544 A * | 8/1986 | Hayhurst | E01H 12/00 | 172/554 |
| 4,608,725 A * | 9/1986 | Jackson | A01D 51/00 | 15/84 |
| 4,802,536 A * | 2/1989 | O'Neal | A01B 33/142 | 56/16.9 |
| 5,133,413 A * | 7/1992 | Baxter | E01H 12/00 | 56/364 |
| 6,540,030 B2 * | 4/2003 | Ohzeki | E01H 12/00 | 171/1 |
| 6,568,482 B2 * | 5/2003 | Ohzeki | E01H 12/00 | 171/111 |
| 6,612,374 B2 * | 9/2003 | Ohzeki | E01H 12/00 | 171/111 |
| 6,634,434 B2 * | 10/2003 | Ohzeki | E01H 12/00 | 171/111 |
| 6,640,906 B2 * | 11/2003 | Ohzeki | E01H 12/00 | 171/65 |
| 7,156,236 B2 * | 1/2007 | Geraghty | E01H 12/00 | 209/616 |
| 7,506,692 B2 * | 3/2009 | Barber | E01H 12/00 | 56/344 |
| 8,359,694 B2 * | 1/2013 | Johnson | E01H 1/045 | 15/82 |
| 8,393,039 B2 * | 3/2013 | Johnson | A01G 20/43 | 15/83 |
| 9,061,695 B1 * | 6/2015 | Mann | B62B 3/10 | |
| 9,832,935 B1 * | 12/2017 | Nitz | A01G 20/43 | |
| 9,988,781 B2 * | 6/2018 | Pickover | B07C 5/34 | |
| 2012/0104730 A1 * | 5/2012 | Goldszer | B62B 1/12 | 280/651 |
| 2021/0254295 A1 * | 8/2021 | Archibald | B60B 19/12 | |

* cited by examiner

200

METHOD AND APPARATUS FOR COLLECTING OBJECTS FROM A SURFACE

TECHNICAL FIELD

The present disclosure relates to an apparatus for collecting objects from a surface, and more specifically, a paddle type pusher to scoop-up debris close to a water body.

BACKGROUND

Red-tides and blue-green algae are examples of harmful algal blooms that have severe impacts on human and aquatic ecosystems. A common effect of such phenomenon is a collection of dead aquatic life on the shores of water bodies that suffer from such algal blooms. The collection of dead aquatic life on the shores of water bodies negatively impacts the aesthetic environment surrounding the water body. The typical process of cleaning the shores of the water body by attempting to pick up one piece of aquatic life at a time may be undesirable for a variety of reasons. Firstly, the aquatic animals may carry germs or bacteria that may harmfully infect any person that comes in contact with them. Secondly, the process of manually picking up one aquatic animal at a time may be cumbersome and time consuming, thereby deterring people who might be willing to undertake such a task. Furthermore, conventional apparatus designed to pick up debris from shores of a water body are large and unwieldy and may not be accessible to the people in general. An apparatus that may help in efficient collection and removal of this accumulated debris will help in improving the aesthetic environment of the water bodies effected by red-tides and blue-green algae.

SUMMARY

An apparatus to scoop debris from a surface is disclosed. In one particular embodiment, the apparatus comprises a trolley frame, a first wheel coupled to a first gear assembly and designed to rotate in a first direction of rotation, and the first gear assembly coupled to a first side of the trolley frame. The apparatus may further comprise a second wheel coupled to a second gear assembly and designed to rotate in the first direction of rotation, and the second gear assembly coupled to a second side of the trolley frame, wherein the second side of the trolley frame is opposite to the first side of the trolley frame. The apparatus may further comprise an axle coupled to the trolley frame, using the first gear assembly and the second gear assembly, wherein the axle is configured to rotate in a second direction opposite to the first direction of rotation of the first wheel and the second wheel. The apparatus may comprise a plurality of parallel spokes attached to the axle that rotate with the axle, wherein each of the plurality of spokes are bent at an angle at their respective ends, and a debris collection net coupled to the trolley frame, wherein the debris collection net is detachable from the trolley frame.

In accordance with other aspects of this particular embodiment, the apparatus further comprises a splatter prevention net coupled to the trolley frame, wherein the splatter prevention net shields a portion of the axle. In accordance with other aspects of this particular embodiment, the splatter prevention net is made of material comprising plastic. In accordance with other aspects of this particular embodiment, the trolley frame is made of material comprising polyvinyl chloride (PVC). In accordance with other aspects of this particular embodiment, the debris collection net is fastened to the trolley frame using at least one of hook and loop fasteners, hook-and-pile fasteners, and touch fasteners. In accordance with other aspects of this particular embodiment, the debris collection net is made of material comprising plastic.

In accordance with other aspects of this particular embodiment, the wheel further comprises a plastic rim, and a rubber tire disposed around the plastic rim. In accordance with other aspects of this particular embodiment, the first gear assembly further comprises a first gear with a first set of teeth securely coupled to the first wheel, a second gear with a second set of teeth securely coupled to a first end of the axle, and the first set of teeth is coupled with the second set of teeth. In accordance with other aspects of this particular embodiment, each of the plurality of spokes is made of material comprising steel. In accordance with other aspects of this particular embodiment, a length of each of the plurality of spokes is less than the radius of the first wheel.

In another embodiment, a method to scoop debris from a surface using an apparatus is described. The method comprises receiving at the apparatus, force to translate the trolley frame in a first direction. In response to the force received at the apparatus, rotating a first wheel and a second wheel in a first direction, wherein the first wheel and the second wheel are coupled to opposite ends of the trolley frame via a first gear assembly and a second gear assembly. The method further comprises rotating an axle that is coupled to the apparatus using the first gear assembly and the second gear assembly, wherein the axle rotates in a second direction opposite to the first direction of rotation, and wherein a plurality of parallel spokes is attached to the axle, and wherein each of the plurality of spokes are bent at an angle at their respective ends. The method further comprises scooping up debris from the surface using the plurality of spokes, and depositing the debris in a first net coupled to the apparatus, wherein the first net is detachable from the apparatus.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF DRAWINGS

Various objectives, features, and advantages of the disclosed subject matter can be more fully appreciated with reference to the following detailed description of the disclosed subject matter when considered in connection with the following drawings, in which like reference numerals identify like elements.

DESCRIPTION

Various debris may wash up on the shore of the water. In certain embodiments, the debris may be remnants of aquatic life, washed ashore from the water body.

According to certain embodiments of the present disclosure, an apparatus is disclosed that enables an efficient collection of debris from a surface. In certain embodiments, the apparatus may collect dead fish and other remnants of aquatic life from the shores of a beach affected by algal blooms, such as red-tides or blue-green algae.

Figure 1:
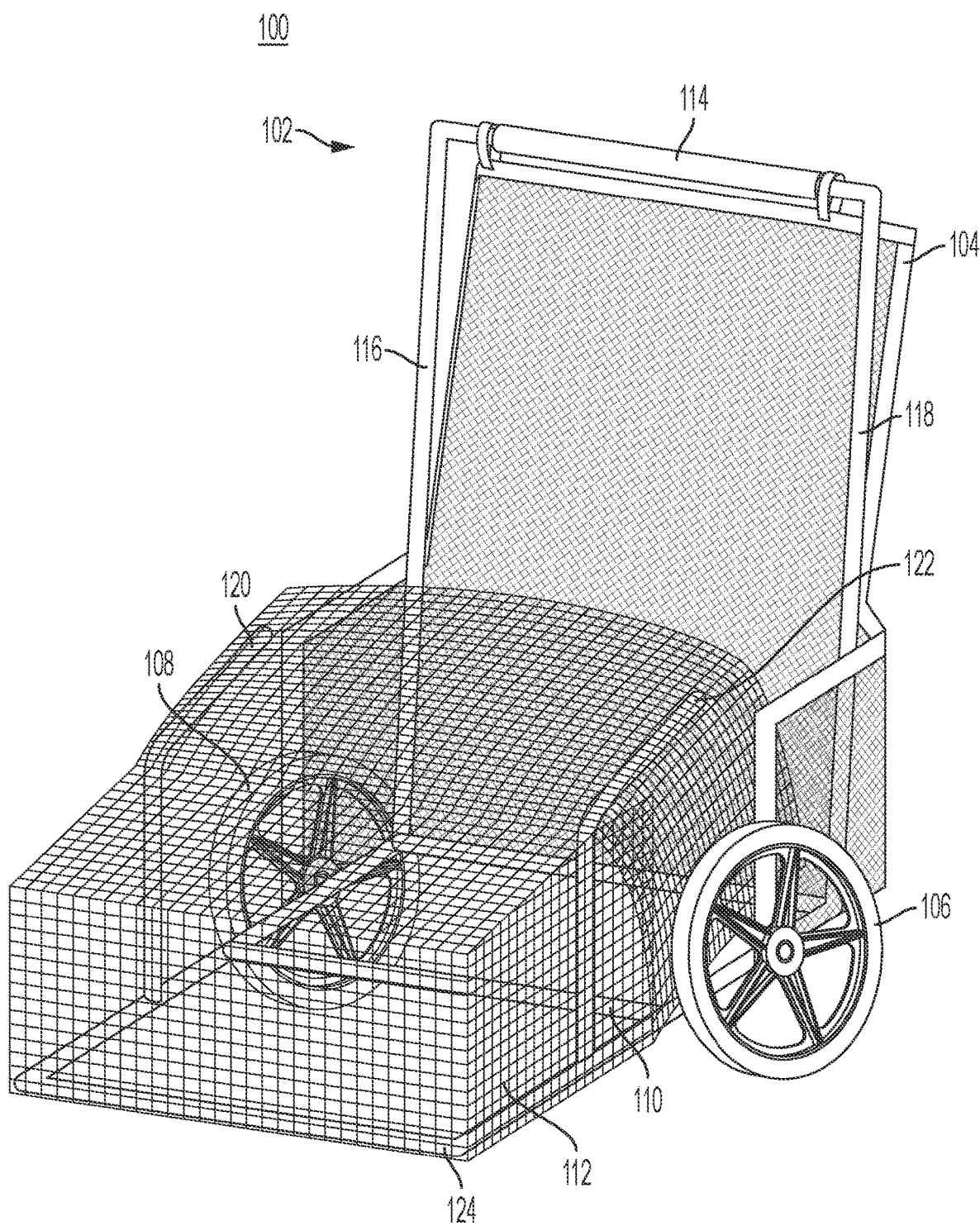
FIG. 1 depicts an apparatus that scoops-up debris from a surface, in accordance with embodiments of the disclosure.

FIG. 1 depicts an apparatus that is capable of scooping up debris from a shore of a beach, in accordance with certain embodiments. As shown in FIG. 1, apparatus 100 includes a trolley frame 102. The trolley frame 102 provides a basic frame structure to the apparatus. The trolley frame 102 includes a handle 114, middle supports 116 and 118, and a bottom frame 124. In certain embodiments, the handle 114 of the trolley frame 102 is connected to the middle supports 116 and 118 of the trolley frame 102 in any suitable manner, such as a straight line or using any desired structural features. In certain embodiments, the handle 114 may be connected to the middle supports 116 and 118 of the trolley frame 102 at an angle. It will be readily apparent to one skilled in the art that the angle of connection between the handle 114 of the trolley frame 102 and the middle supports 116 and 118 of the trolley frame 102 may be one of but is not limited to, a right angle, an acute angle, or an obtuse angle. In certain embodiments, a user using the apparatus 100 may apply a force at the handle 114 of the trolley frame 102 to guide the apparatus 100 in a particular direction. The force applied may be transmitted from the handle 114 of the trolley frame 102 through the middle supports 116 and 118 to the bottom frame 124 of the trolley frame 102.

The middle supports 116 and 118 of the trolley frame 102 include two vertical supports that connect the handle 114 of the trolley frame 102 to the bottom frame 124 of the trolley frame 102 as shown in FIG. 1. However, the apparatus 100 is not limited to only two vertical supports as shown in FIG. 1. Additional vertical supports can be added for structural support as will be readily apparent to one skilled in the art. In certain embodiments, the middle supports 116 and 118 of the trolley frame 102 are connected to the bottom frame 124 of the trolley frame 102 at a right angle. In certain embodiments, the middle supports 116 and 118 of the trolley frame 102 are connected to the bottom frame 124 of the trolley frame 102 at an obtuse angle.

Figure 3:
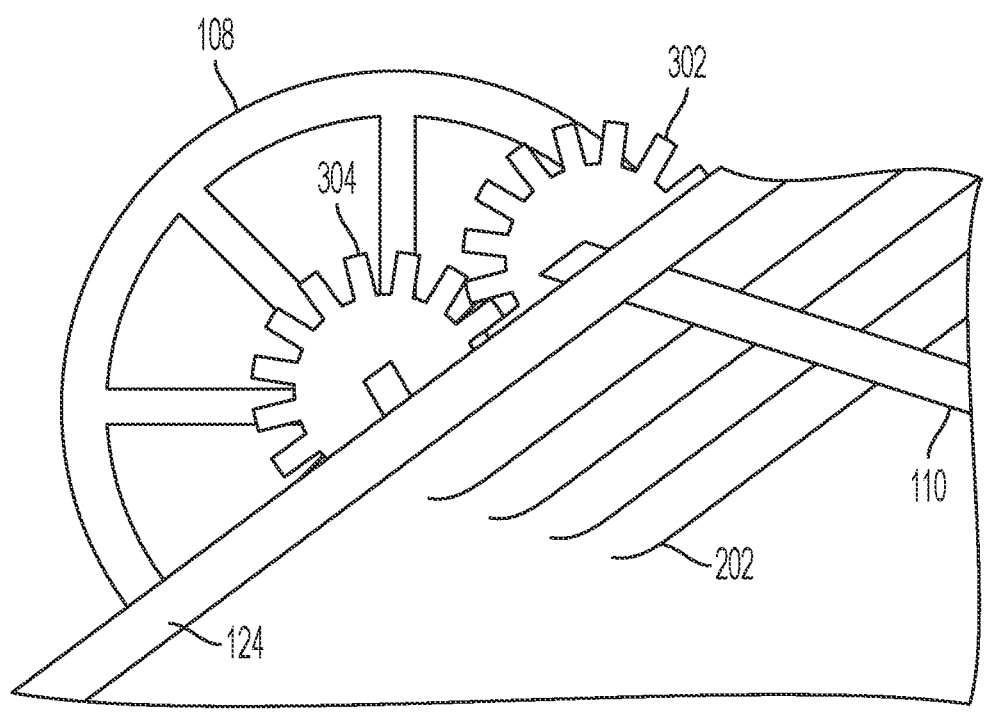
FIG. 3 depicts a gear assembly that is used to couple an axle to a frame of the apparatus that scoops-up debris from a surface, in accordance with embodiments of the disclosure.

The bottom frame 124 of the trolley frame 102 may be rectangular. In certain embodiments, the bottom frame 124 of the trolley frame 102 may be a shape other than a rectangular shape. In certain embodiments, the bottom frame 124 of the trolley frame 102 may include additional crossbars (not shown) that provide structural stability to the trolley frame 102. In certain embodiments, the bottom frame 124 may be coupled to a gear assembly 300 as shown in FIG. 3. In certain embodiments, gear assembly 300 may be coupled to opposite sides of the bottom frame 124. As shown in FIG. 3, in certain embodiments, gear assembly 300 may include a wheel gear 304, which is operably coupled to an axle gear 302 with teeth that mesh together. In such embodiments, wheel gear 304 is coupled to wheels 106 and 108 of the apparatus 100, and axle gear 302 is coupled to the sides of axle 110 in the bottom frame 124. Although FIG. 3 shows only one portion of the axle 110, a similar setup is replicated on the opposite side of the bottom frame 124 coupled to wheel 106 of the apparatus 100. In certain embodiments, wheels 106 and 108 can assist in the mobility of the trolley frame 102.

In certain embodiments, a portion of the force that is applied at the handle 114 of the apparatus 100, that is transmitted through the trolley frame 102 and received at the bottom frame 124 of the trolley frame 102, begins rotation of the wheels 106 and 108 in a first direction. The rotation of the wheels 106 and 108 may begin translation motion of apparatus 100. In certain embodiments, wheels 106 and 108 may comprise a rubber tire disposed over a plastic rim. In certain embodiments, wheels may be chosen to make the apparatus 100 operational over surfaces of varying hardness. For examples, wheels 106 and 108 may be chosen so that they may function efficiently on many different types of surfaces, such as sandy surface of a beach, hard surface of a sidewalk, grassy surface of a park, wooden surface of a boardwalk, to name a few. Furthermore, the apparatus 100 is not limited to only two wheels as shown in FIG. 1. Additional wheels can be added as desired and will be readily apparent to one skilled in the art.

Figure 2:
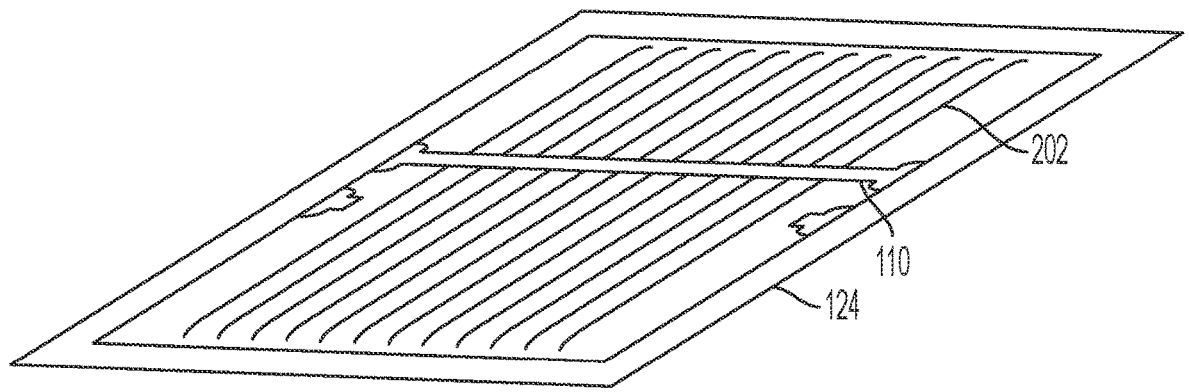
FIG. 2 depicts an axle assembly of the apparatus that scoops-up debris from a surface, in accordance with embodiments of the disclosure.

In certain embodiments, the coupling of the wheel gear 304 with the axle gear 302 in this manner may allow the axle 110 to rotate in a direction opposite to that of the direction of rotation of the wheels 106 and 108. In certain embodiments, as shown in FIG. 2, the axle 110 may include a plurality of spokes 202 attached radially outwards from the axle 110 that can assist in scooping up debris from the shore and placing the debris in a debris collection net 104 (shown in FIG. 1) fastened to the trolley frame 102. The gear assembly 300 is not limited to only two gears as discussed. Additional gear assemblies (not shown) can be added for mobility and/or additional axles with spokes (not shown) as will be readily apparent to one skilled in the art.

In certain embodiments, the trolley frame 102 may be formed from any load bearing structures, such as pipes, bars, and rods. Some exemplary materials that can be utilized to form the trolley frame 102 include polyvinyl chloride (PVC), aluminum, iron, wood, and many others.

As shown in FIG. 1, a debris collection net 104 can be fastened to the handle 114 of the trolley frame 102. In certain embodiments, the debris collection net 104 may be fastened at multiple points on the trolley frame 102 to securely hold the debris collection net 104 in place. The debris collection net 104 may be detachable from the trolley frame 102. For example, if the debris collection net 104 is filled with debris, the debris collection net 104 can be detached to dispose the debris. Once the debris is disposed, the empty debris collection net 104 may be refastened to the handle 114 for later use. In certain embodiments, means for fastening the debris collection net 104 to the handle 114 and/or other parts of the trolley frame 102 may include hook and loop fasteners, hook-and-pile fasteners, and touch fasteners. In certain embodiments, debris collection net 104 may be composed of a variety of materials, such as plastic, cloth, jute, nylon, and many others. The material of the debris collection net 104 may be selected to withstand a variety of weather conditions such as extreme heat, extreme cold, rain, snow and wind.

In certain embodiments, the bottom frame 124 of the trolley frame 102 may have vertical supports 120 and 122 disposed on opposite sides of the bottom frame 124 of the trolley frame 102. In certain embodiments, the vertical supports 120 and 122 are used to support a splatter prevention net 112 that is disposed towards the front of trolley frame 102 shields the axle 110 and may be used to prevent splatter of debris when axle 110 is scooping up debris from the surface. In certain embodiments, the splatter prevention net 112 may be permanently fastened to the trolley frame 102. In certain embodiments, splatter prevention net 112 may be temporarily fastened to trolley frame 102. Methods of temporary and permanent fastening may include hook and loop fasteners, hook-and-pile fasteners, and touch fasteners. In certain embodiments, splatter prevention net 112 may be composed of the same material as debris collection net 104.

FIG. 2 depicts an axle assembly 200 of the apparatus 100 that is operably connected to the bottom frame 124 to allow scooping up debris from a surface, in accordance with embodiments of the disclosure. Axle assembly 200 includes the axle 110 outfitted with a plurality of spokes 202. Moreover, as shown in FIG. 3, the axle 110 can be coupled to axle gear 302 of gear assembly 300. The axle gear 302 is coupled to a wheel gear 304, that is in turn coupled to the bottom frame 124 of the trolley frame 102. Although only one side of axle 110 is shown in FIG. 3, the opposite side of axle 110 is coupled to an axle gear similar to the axle gear 302 on the opposite side of the rectangular frame 124 of the bottom frame 124. In certain embodiments, the gear assembly 300 is provided to allow the axle 110 to rotate in a direction that is opposite to the direction of rotation of the wheels 106 and 108.

The axle 110 has a plurality of parallel spokes 202 that are attached in two radially outward directions from the axle 110. In certain embodiments, the spacing of between each of the plurality of spokes may be based on the general size of debris that the apparatus 100 is trying to scoop up in the debris collection net 104. It will be apparent to one skilled in the art, that wider spaced plurality of spokes 202 may be used to scoop up larger sized debris, whereas closer spaced plurality of spokes 202 may be used to scoop up debris of relatively smaller size. In certain embodiments, the angle between the radially outward directions may be one hundred and eighty degrees. It will be readily apparent to one skilled in the art that the angle of connection between the two radially outward directions of the plurality of spokes 202 may be one of but is not limited to, a right angle, an acute angle, or an obtuse angle. In certain embodiments, the length of the spokes 220 can be designed such that the spokes are long enough to be able to dig into a surface over which the apparatus 100 is being used, but not so long that the spokes break while rotating along with the wheels of the apparatus 100. In certain embodiments, the spokes are not longer than the radii of the wheels 106 and 108. The plurality of spokes 202 attached to the axle 110, rotate along with the axle 110 in a circular motion. In certain embodiments, the circular motion of the plurality of spokes 202 can scoop up any desired debris on the surface over which the apparatus is moving, that comes in contact with the plurality of spokes 202, in the debris collection net 104 shown in FIG. 1. In certain embodiments, each of the spokes 202 are bent at an angle. In such embodiments, the bend angle is chosen so as to prevent the plurality of spokes from breaking as they repeatedly come in contact with the surface over which the apparatus 100 moves. In certain embodiments, the bend angle is chosen so as to increase the efficiency while picking up debris from the surface. The bent design of the spokes ensures that the debris that is scooped from the surface does not slide off the spokes as the spokes rotate. In certain embodiments, the plurality of spokes 202 may shaped as pipes, bars, and rods. In certain embodiments, some exemplary materials that can be utilized to form the plurality of spokes 202 include polyvinyl chloride (PVC), aluminum, iron, wood, and many others. In such embodiments, the shape of the plurality of spokes, and the composition materials of the spokes are chosen to withstand the stress of constant contact with the surface. In certain embodiments, the plurality of spokes 202 may be disengaged from the axle 110. This may help in transporting the apparatus 100 without the spinning of the spokes.

FIG. 3 depicts a gear assembly 300 that is used to couple the axle 110 to the bottom frame 124 that allows the plurality of spokes 202 to scoop up debris from a surface, in accordance with embodiments of the disclosure. FIG. 3 depicts a gear assembly 300 that includes an axle gear 302 and a wheel gear 304. In certain embodiments, the gear assembly 300 is coupled to the bottom frame 124 of the trolley frame 102 on two different sides of the bottom frame 124. The axle gear 302 is coupled to the axle 110. The wheel gear 304 is coupled to the wheels 106 and 108 as described in FIG. 1. The wheel gear 304 rotates in a direction similar to that of the direction of rotation of the wheels 106 and 108.

In certain embodiments, the connection of the wheel gears 302 and 304 in this manner may allow the axle gear 302 to rotate the axle 110 in a direction opposite to that of the direction of rotation of the wheel gear 304. The opposite direction of rotation of the axle 110 rotates a plurality of spokes 202 that are connected to the axle 110 to scoop up debris and place the scooped-up debris into the debris collection net 104 fastened to the trolley frame 102 as described in FIG. 1.

Figure 4:
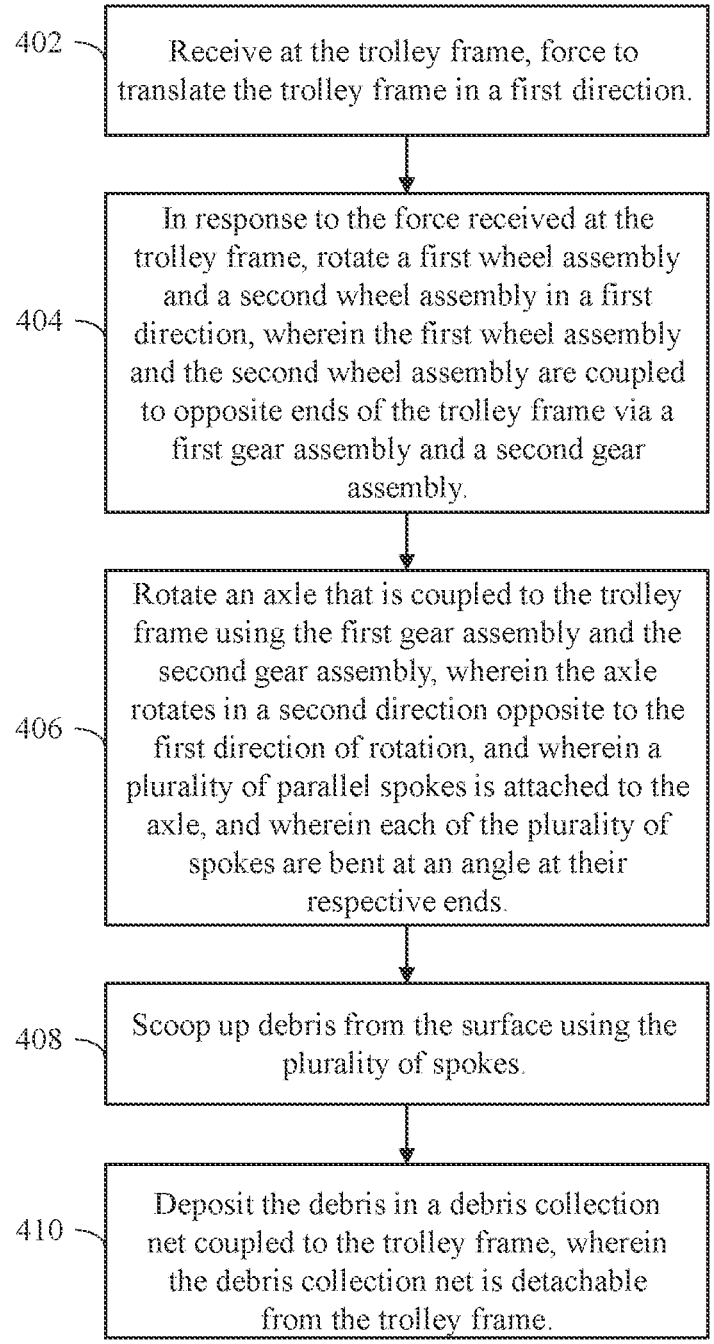
FIG. 4 depicts an illustrative flowchart of a process of scooping up debris from a surface, in accordance with embodiments of the disclosure.

FIG. 4 depicts an illustrative flowchart of a process of scooping up debris from a surface, in accordance with embodiments of the disclosure.

At 402, the apparatus 100 receives a force to translate the apparatus 100 in a first direction. At 404, in response to the force received at the apparatus 100, wheels 106 and 108 rotate in a first direction, wherein the first wheel 106 and the second wheel 108 are coupled to opposite sides of the trolley frame 102. At 406, axle 110 that is coupled to the trolley frame 102 using wheel gears 302 and 304 is rotated, wherein the axle 110 rotates in a second direction opposite to the first direction of rotation, and wherein a plurality of parallel spokes 202 is attached to the axle 110, and wherein each of the plurality of spokes 202 are bent at an angle at their respective sides. At 408, the plurality of spokes 202 scoop up debris from the surface. At 410, the debris is deposited in a debris collection net 104 coupled to the trolley frame 102, wherein the first debris collection net 104 is detachable from the trolley frame 102.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, can readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter can be made without departing from the spirit and scope of the disclosed subject matter, which is limited only by the claims which follow.

What is claimed is:

1. An apparatus, comprising:
a trolley frame;
a first wheel coupled to a first gear assembly and designed to rotate in a first direction of rotation, and the first gear assembly coupled to a first side of the trolley frame;
a second wheel coupled to a second gear assembly and designed to rotate in the first direction of rotation, and the second gear assembly coupled to a second side of the trolley frame, wherein the second side of the trolley frame is opposite to the first side of the trolley frame;
an axle coupled to the trolley frame, using the first gear assembly and the second gear assembly, wherein the axle is configured to rotate in a second direction opposite to the first direction of rotation of the first wheel and the second wheel;
a plurality of parallel spokes attached to the axle that rotate with the axle, wherein
each of the plurality of spokes are bent at an angle at their respective ends and a length of each of the plurality of spokes is less than a radius of the first wheel; and
a debris collection net coupled to the trolley frame, wherein the debris collection net is detachable from the trolley frame.

2. The apparatus of claim 1, further comprising:
a splatter prevention net coupled to the trolley frame, wherein the splatter prevention net shields a portion of the axle.

3. The apparatus of claim 2, wherein the splatter prevention net is made of material comprising plastic.

4. The apparatus of claim 1, wherein the trolley frame is made of material comprising polyvinyl chloride (PVC).

5. The apparatus of claim 1, wherein the debris collection net is made of material comprising plastic.

6. The apparatus of claim 1, wherein the wheel further comprises:
a plastic rim; and
a rubber tire disposed around the plastic rim.

7. The apparatus of claim 1, wherein the first gear assembly further comprises:
a first gear with a first set of teeth securely coupled to the first wheel;
a second gear with a second set of teeth securely coupled to a first end of the axle; and
the first set of teeth is coupled with the second set of teeth.

8. The apparatus of claim 1, wherein each of the plurality of spokes is made of material comprising steel.

9. A method to scoop debris from a surface using an apparatus, the method comprising:
receiving at the apparatus, force to translate the trolley frame in a first direction;
in response to the force received at the apparatus, rotating a first wheel and a second wheel in a first direction, wherein the first wheel and the second wheel are coupled to opposite ends of the trolley frame via a first gear assembly and a second gear assembly;
rotating an axle that is coupled to the apparatus using the first gear assembly and the second gear assembly, wherein the axle rotates in a second direction opposite to the first direction of rotation, and wherein a plurality of parallel spokes is attached to the axle, and wherein each of the plurality of spokes are bent at an angle at their respective ends and a length of each of the plurality of spokes is less than a radius of the first wheel;
scooping up debris from the surface using the plurality of spokes; and
depositing the debris in a debris collection net coupled to the apparatus, wherein the debris collection is detachable from the apparatus.

10. The method of claim 9, further comprising:
a splatter prevention net coupled to the trolley frame, wherein the splatter prevention net encloses a portion of the axle.

11. The method of claim 10, wherein the splatter prevention net is made of material comprising plastic.

12. The method of claim 9, wherein the trolley frame is made of material comprising polyvinyl chloride (PVC).

13. The method of claim 9, wherein the debris collection net is fastened to the trolley frame using at least one of hook and loop fasteners, hook-and-pile fasteners, and touch fasteners.

14. The method of claim 9, wherein the debris collection net is made of material comprising plastic.

15. The method of claim 9, wherein the wheel further comprises:
a plastic rim; and
a rubber tire disposed around the plastic rim.

16. The method of claim 9, wherein the first gear assembly further comprises:
a first gear with a first set of teeth securely coupled to the first wheel;
a second gear with a second set of teeth securely coupled to a first end of the axle; and
the first set of teeth is coupled with the second set of teeth.

17. The method of claim 9, wherein each of the plurality of spokes is made of material comprising steel.

18. An apparatus, comprising:
a trolley frame;
a first wheel coupled to a first gear assembly and designed to rotate in a first direction of rotation, and the first gear assembly coupled to a first side of the trolley frame;
a second wheel coupled to a second gear assembly and designed to rotate in the first direction of rotation, and the second gear assembly coupled to a second side of the trolley frame, wherein the second side of the trolley frame is opposite to the first side of the trolley frame;
an axle coupled to the trolley frame, using the first gear assembly and the second gear assembly, wherein the axle is configured to rotate in a second direction opposite to the first direction of rotation of the first wheel and the second wheel;
a plurality of parallel spokes attached to the axle that rotate with the axle, wherein each of the plurality of spokes are bent at an angle at their respective ends; and
a debris collection net coupled to the trolley frame, wherein the debris collection net is fastened to the trolley frame using at least one of hook and loop fasteners, hook-and-pile fasteners, and touch fasteners, and wherein the debris collection net is detachable from the trolley frame.

* * * * *